United States Patent [19]

Gu et al.

[11] Patent Number: 4,621,930
[45] Date of Patent: Nov. 11, 1986

[54] FOIL THRUST BEARING COOLING

[75] Inventors: Alston L. Gu, Rancho Palos Verdes; Marshall P. Saville, Lawndale, both of Calif.

[73] Assignee: The Garrett Corporation, Los Angeles, Calif.

[21] Appl. No.: 656,399

[22] Filed: Oct. 1, 1984

[51] Int. Cl.$^4$ .......................................... F16C 32/06
[52] U.S. Cl. .................................................. 384/105
[58] Field of Search ............... 384/99, 100, 103, 104, 384/105, 106, 119, 124, 125, 397

[56] References Cited

U.S. PATENT DOCUMENTS

| | | | |
|---|---|---|---|
| 3,382,014 | 5/1968 | Marley | 384/121 X |
| 3,635,534 | 1/1972 | Barnett | 384/106 |
| 3,893,733 | 7/1975 | Silver et al. | 384/106 |
| 4,153,315 | 5/1979 | Silver et al. | 384/106 |
| 4,227,753 | 10/1980 | Wilcock | 384/105 |
| 4,247,155 | 1/1981 | Fortmann | 384/124 |

Primary Examiner—Stuart S. Levy
Assistant Examiner—David Werner
Attorney, Agent, or Firm—Albert J. Miller

[57] ABSTRACT

Cooling is provided for a foil thrust bearing by means of flow openings in the thrust bearing disk or restrictions in the flow underneath the thrust bearing disk or the combination of both.

26 Claims, 11 Drawing Figures

FOIL THRUST BEARING COOLING

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions, form a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they do introduce the requirement for an external source of clean fluid under pressure.

In order to properly position the compliant foils between the relatively movable bearing elements a number of mounting means have been devised. In thrust bearings, it is conventional practice to mount a plurality of individually spaced foils on a foil bearing disk such as by spot welds and position the foil bearing disk on one of the bearing elements as exemplified in U.S. Pat. No. 3,635,534.

To establish stability of the foils in most of these mounting means, a substantial pre-load is required on the foil. That is, the individual foils must be loaded against the relatively movable bearing element opposed to the bearing element upon which the foils are mounted. It has been conventional to provide separate compliant stiffener elements or underfoils beneath the foils to supply this required preload as exemplified in U.S. Pat. Nos. 3,893,733 and 4,153,315.

In order to facilitate start-up and to reduce bearing wear, the individual foils may be coated with a high lubricity material such as a stratified fluorocarbon, molybdenum disulfide, graphite fluoride, or the like. The use of such coatings, while enhancing the life of the foil bearing, introduces certain operating temperature limitations thereon. As still higher temperature environments are envisioned for foil bearing operation, the temperature limitations of these coatings become critical since they cannot survive as high a temperature as the underlying metallic foil. Thus, higher temperature coatings must be developed or means found to limit the operating temperature at the coated foil surfaces. Examples of prior cooling schemes for foil bearing can be found in U.S. Pat. Nos. 4,227,753 and 4,247,155.

SUMMARY OF THE INVENTION

In the present invention, the thrust bearing disk is provided with openings between the foils to enable the flow of cooling fluid over the foils. Alternatively, flow shields or restrictions, either integral with the thrust bearing disk or integral or affixed to the bearing housing or thrust plate, are provided to limit the flow of cooling fluid through the underspring and thereby correspondingly increase the flow of cooling fluid between the thrust bearing disk and the thrust runner. Viscous shearing of the fluid flim between the thrust bearing foils and the thrust runner is a significant source of heating of the coated foil surfaces.

DESCRIPTION OF THE PREFERRED EMBODIMENTS

Figure 1:
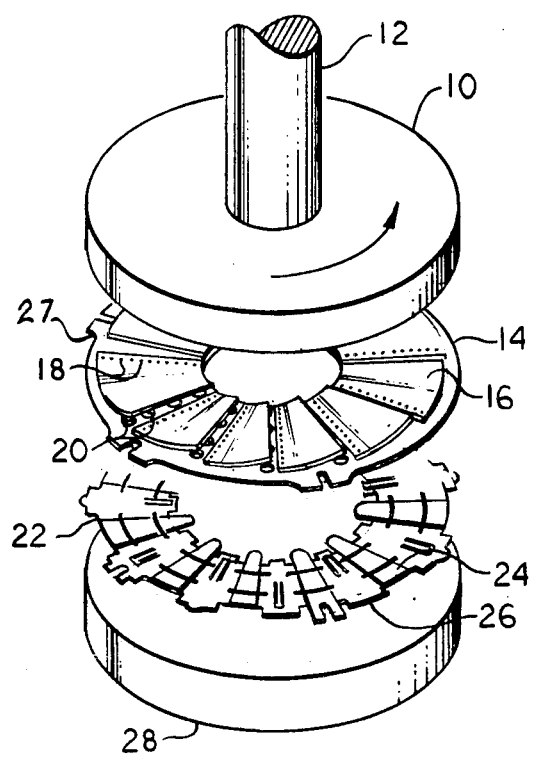
FIG. 1 is an exploded perspective view of a foil thrust bearing of the present invention.

As illustrated in FIG. 1, the thrust runner 10 including shaft 12 is rotatably supported on the thrust plate 28 by means of the thrust bearing disk 14 and thrust bearing stiffener or underspring 22. The thrust bearing disk 14 includes a plurality of resilient metallic foils 16 affixed thereto by a transverse row of spot welds 18 or by other suitable means. The thrust bearing underspring 22 includes a plurality of upper ridges 24 and lower ridges 26 alternately disposed thereon to provide preload and support for the thrust bearing disk 14.

Figure 2:
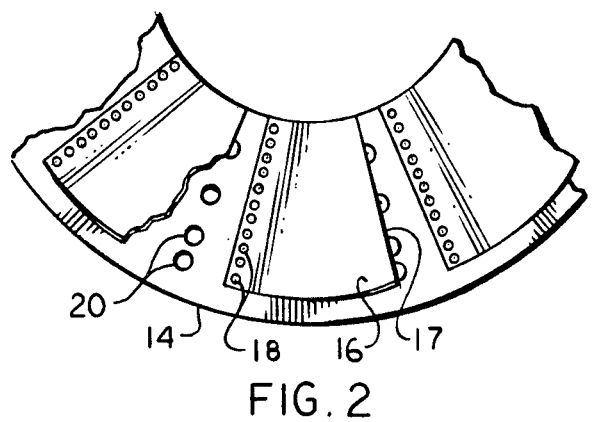
FIG. 2 is an enlarged fragmentary view, partially cut away, of the bearing disk of the foil thrust bearing of FIG. 1.

As more fully shown in FIG. 2, a plurality of cooling holes 20 are disposed in the thrust bearing disk 14 under the trailing edge 17 of the resilient foils 16. The exact number and precise location of these cooling holes 20 is to permit the flow of sufficient cooling fluid from underneath the thrust bearing disk 14 to cool the upper surface of the foils 16 which may be coated with a high lubricity material.

Figure 3:
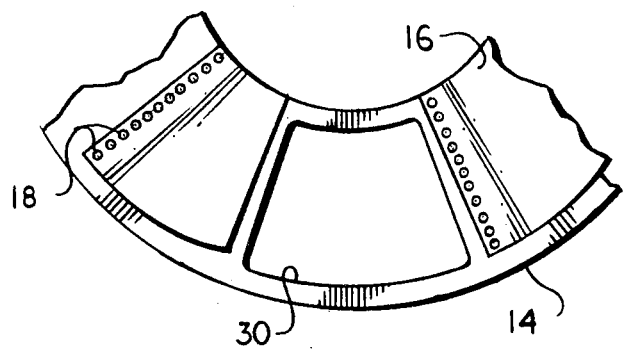
FIG. 3 is an enlarged fragmentary view of an alternate bearing disk for the foil thrust bearing of FIG. 1.

FIG. 3 illustrates an alternative arrangement in which a single much larger cooling hole 30 is provided between the foils 16 attached to the thrust bearing disk 14 by spot welds 18. Whereas in the illustration of FIG. 2, the number of foils provided on the disk 14 is maintained with the cooling holes 20 provided generally between adjacent foils, the embodiment of FIG. 3 generally eliminates one-half of the individual foils and substitutes for alternate foils the much larger cooling holes 30. Thus, while additional cooling can be provided in the FIG. 2 embodiment without any significant decrease in load, the performance of the FIG. 3 embodiment, which eliminates generally one-half of the foils, will decrease the load bearing capacity of the thrust bearing. The FIG. 3 embodiment will, however, provide much greater cooling since the size of the cooling passages are much larger.

Figure 4:
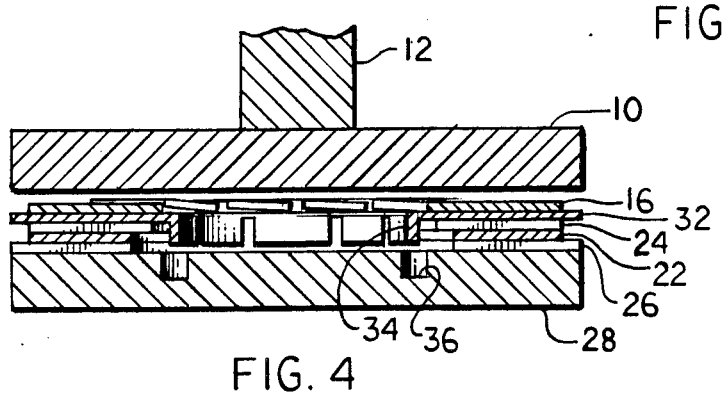
FIG. 4 is a transverse cross-sectional view of a foil thrust bearing having a flow shield integral with the thrust bearing disk.

Illustrated in FIG. 4 is a foil thrust bearing in which the thrust bearing disk 32 is provided with a downturned flange or shield 34 at the inner diameter thereof. This flange or shield 34 will decrease the flow of fluid through the underspring 22 and thereby increase of the flow of fluid across the top of the thrust bearing disk 32 upon which are mounted the foils 16. Since the thrust bearing disk 32, depending upon load and operating conditions, will move downward and compress the underspring 22, an annular groove 36 may be provided in the thrust plate 28 to prevent contact between the flange 34 and the thrust plate 28.

Figure 5:
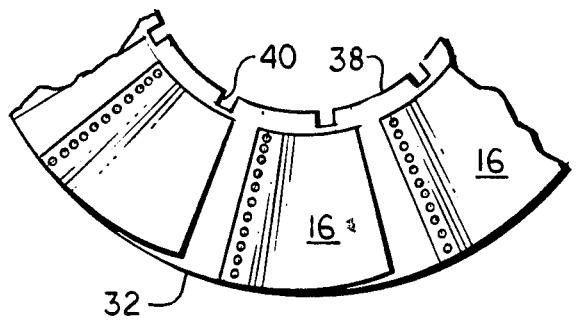
FIG. 5 is a fragmentary plan view of the thrust bearing disk of FIG. 4 during fabrication thereof.

The thrust bearing disk 32 having flange 34 may be fabricated in accordance with the illustration in FIG. 5. The disk 32 may be provided with spaced slots 40 at its inner diameter thus leaving projections 38 which may be bent in a downward direction away from the foils 16 to thereby provide the shields 34.

Figure 6:
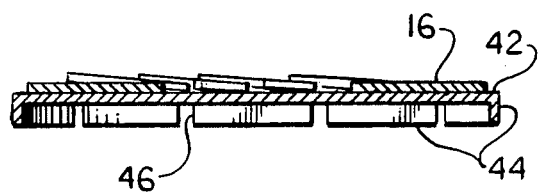
FIG. 6 is a partial sectional view of an alternate foil thrust bearing having a flow shield integral with the thrust bearing disk.

FIG. 6 illustrates an alternative arrangement in which the flow shields 44 are provided at the outer diameter of the thrust bearing disk 42. A plurality of slots 46 will be present if the flange or shields 44 are produced in the same manner as the shields 34 at the inner diameter of the disk.

Figure 7:
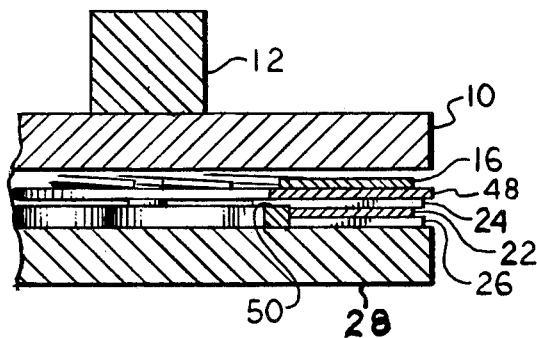
FIG. 7 is a fragmentary sectional view of an alternate foil thrust bearing of the present invention.
Figure 8:
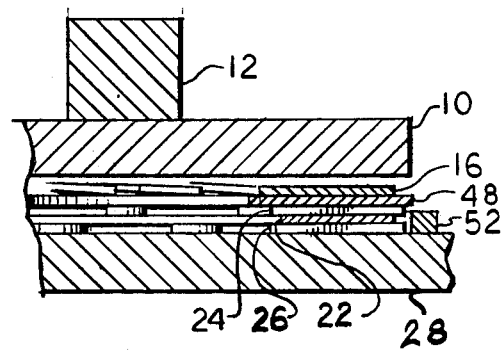
FIG. 8 is a fragmentary sectional view of yet another alternate foil thrust bearing of the present invention.

Instead of providing flow shields integral with the thrust bearing disk, it is possible to provide suitable flow shields either integral with or attached to the thrust plate 28. As shown in FIG. 7, a flow control shield 50 may be provided at the inner diameter of the thrust bearing disk 48 while FIG. 8 illustrates the alternative embodiment where the shield 52 is provided at the outer diameter of the thrust bearing disk 48.

Figure 9:
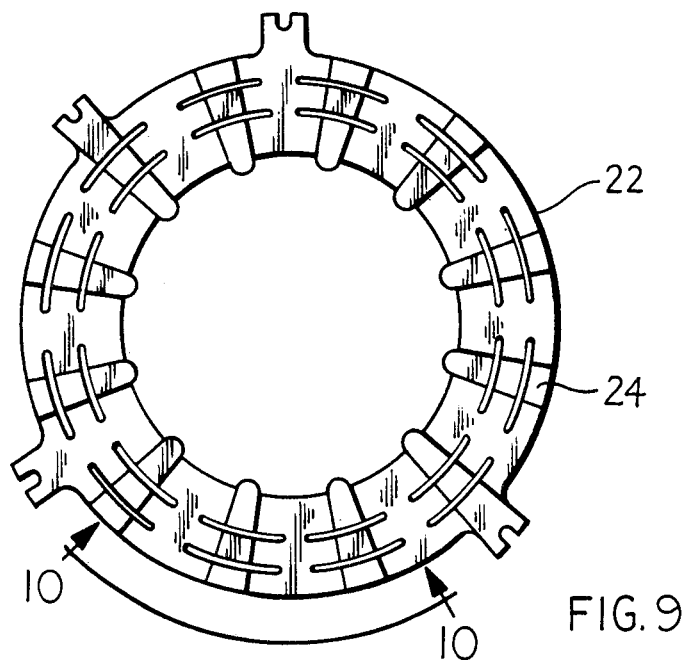
FIG. 9 is a top plan view of the underspring of the foil thrust bearing of FIG. 1.
Figure 10:
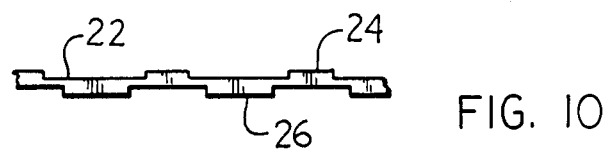
FIG. 10 is a cross-section view of the underspring of FIG. 9 taken along line 10—10 thereof.
Figure 11:
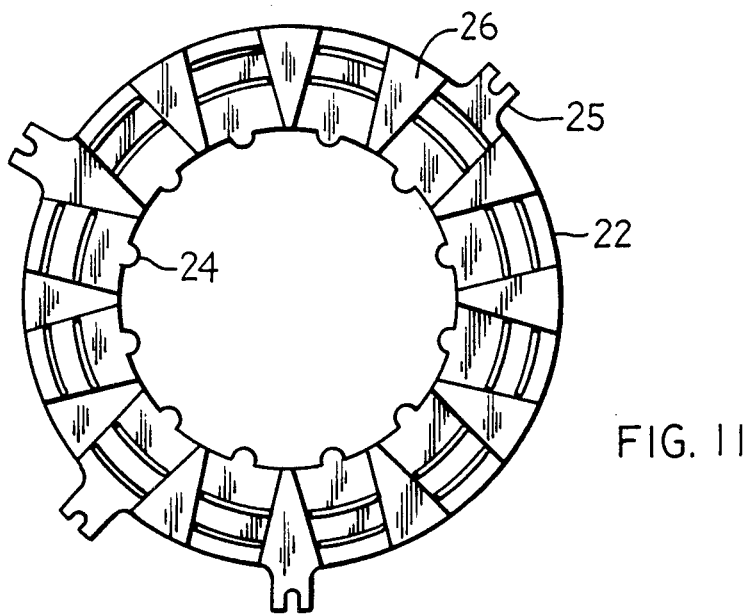
FIG. 11 is a bottom plan view of the underspring of FIG. 9.

FIGS. 9 and 11 illustrate the underspring 22 utilized in the foil thrust bearing of this invention. Besides the upper ridges 24 and lower ridges 26, also shown are the projections 25 which can be utilized to maintain the position of the underspring 22 with respect to the thrust plate 28. Similar projections 27 may be provided on the thrust bearing disk 14.

As should be readily apparent, it is the intent of each of the above embodiments to provide cooling flow to the upper surfaces of the thrust bearing disk which includes foils coated with a high lubricity material and which are subjected to the highest temperatures. This cooling flow, if not directed to the upper surfaces of the thrust bearing disk, would otherwise pass through the underspring underneath the thrust bearing disk. This objective is accomplished by either providing openings in the thrust bearing disk or providing restrictions to the flow of cooling fluid underneath the thrust bearing disk. It should also be recognized that these two features can be combined such that there would be both cooling flow openings in the disk and flow restriction thereunder.

While specific embodiments of the invention have been illustrated and described, it is understood that these are provided by way of example only. While the invention is shown as a thrust bearing, it should be readily apparent that it is equally applicable to a conical bearing which has a thrust component. The invention is to be construed as being limited only by the proper scope of the following claims.

We claim:
1. A fluid thrust bearing comprising:
a pair of members arranged for relative rotation with respect to one another, one of said pair of members adapted to rotatably support the other;
a compliant foil bearing operably disposed between said pair of relatively rotatable members and mounted to one thereof, said complaint foil bearing comprising a thrust disk having a plurality of individual, spaced, compliant foils mounted thereon and a foil stiffener disk having a plurality of upper and lower ridges alternately transversely disposed therearound and disposed between the thrust disk and the one of said pair of members to which the foil bearing is mounted; and a cooling flow directing flange at the inner diameter of said thrust disk directed towards said foil stiffener disk to direct the flow of cooling fluid from around the foil stiffener disk to the compliant foils on the thrust disk.

2. A fluid thrust bearing comprising:
a pair of members arranged for relative rotation with respect to one another, one of said pair of members adapted to rotatably support the other;
a compliant foil bearing operably disposed between said pair of relatively rotatable members and mounted to one thereof, said complaint foil bearing comprising a thrust disk having a plurality of individual, spaced, compliant foils mounted thereon and a foil stiffener disk having a plurality of upper and lower ridges alternately transversely disposed therearound and disposed between the thrust disk and the one of said pair of members to which the foil bearing is mounted; and a cooling flow directing flange at the outer diameter of said thrust disk directed towards said foil stiffener disk to direct the flow of cooling fluid from around the foil stiffener disk to the compliant foils on the thrust disk.

3. A fluid thrust bearing comprising:
a pair of members arranged for relative rotation with respect to one another, one of said pair of members adapted to rotatably support the other;
a compliant foil bearing operably disposed between said pair of relatively rotatable members and mounted to one thereof, said complaint foil bearing comprising a thrust disk having a plurality of individual, spaced, complaint foils mounted thereon and a foil stiffener disk having a plurality of upper and lower ridges alternately transversely disposed therearound and disposed between the thrust disk and the one of said pair of members to which the foil bearing is mounted; and a cooling flow directing annular shield disposed on the one of said pair of members to which the foil bearing is mounted at the inner diameter of said foil stiffener disk to direct the flow of cooling fluid from around the foil stiffener disk to the compliant foils on the thrust disk.

4. A fluid thrust bearing comprising:

a pair of members arranged for relative rotation with respect to one another, one of said pair of members adapted to rotatably support the other;

a compliant foil bearing operably disposed between said pair of relatively rotatable members and mounted to one thereof, said complaint foil bearing comprising a thrust disk having a plurality of individual, spaced, compliant foils mounted thereon and a foil stiffener disk having a plurality of upper and lower ridges alternately transversely disposed therearound and disposed between the thrust disk and the one of said pair of members to which the foil bearing is mounted; and a cooling flow directing annular shield disposed on the one of said pair of members to which the foil bearing is mounted at the outer diameter of said foil stiffener disk to direct the flow of cooling fluid from around the foil stiffener disk to the compliant foils on the thrust disk.

5. A fluid thrust bearing comprising:

a pair of members arranged for relative rotation with respect to one another, one of said pair of members adapted to rotatably support the other;

a compliant foil bearing operably disposed between said pair of relatively rotatable members and mounted to one thereof, said complaint foil bearing comprising a thrust disk having a plurality of individual, spaced, compliant foils mounted thereon and a foil stiffener disk having a plurality of upper and lower ridges alternately transversely disposed therearound and disposed between the thrust disk and the one of said pair. of members to which the foil bearing is mounted; and cooling flow directing means including a plurality of openings in said thrust disk and a flange at the inner diameter of said thrust disk directed towards said foil stiffener disk to direct the flow of fluid from around the foil stiffener disk to the compliant foils on the thrust disk.

6. A fluid thrust bearing comprising:

a pair of members arranged for relative rotation with respect to one another, one of said pair of members adapted to rotatably support the other;

a compliant foil bearing operably disposed between said pair of relatively rotatable members and mounted to one thereof, said complaint foil bearing comprising a thrust disk having a plurality of individual, spaced, compliant foils mounted thereon and a foil stiffener disk having a plurality of upper and lower ridges alternately transversely disposed therearound and disposed between the thrust disk and the one of said pair of members to which the foil bearing is mounted; and cooling flow directing means including a plurality of openings in said thrust disk and a flange at the outer diameter of said thrust disk directed towards said foil stiffener disk to direct the flow of cooling fluid from around the foil stiffener disk to the compliant foils on the thrust disk.

7. A fluid thrust bearing comprising:

a pair of members arranged for relative rotation with respect to one another, one of said pair of members adapted to rotatably support the other;

a compliant foil bearing operably disposed between said pair of relatively rotatable members and mounted to one thereof, said complaint foil bearing comprising a thrust disk having a plurality of individual, spaced, compliant foils mounted thereon and a foil stiffener disk having a plurality of upper and lower ridges alternately transversely disposed therearound and disposed between the thrust disk and the one of said pair of members to which the foil bearing is mounted; and a cooling flow directing means including a plurality of openings in said thrust disk and an annular shield disposed on the one of said pair of members to which the foil bearing is mounted at the inner diameter of said foil stiffener disk to direct the flow of cooling fluid from around the foil stiffener disk to the compliant foils on the thrust disk.

8. A fluid thrust bearing comprising:

a pair of members arranged for relative rotation with respect to one another, one of said pair of members adapted to rotatably support the other;

a compliant foil bearing operably disposed between said pair of relatively rotatable members and mounted to one thereof, said complaint foil bearing comprising a thrust disk having a plurality of individual, spaced, compliant foils mounted thereon and a foil stiffener disk having a plurality of upper and lower ridges alternately transversely disposed therearound and disposed between the thrust disk and the one of said pair of members to which the foil bearing is mounted; and cooling flow directing means including a plurality of openings in said thrust disk and an annular shield disposed on the one of said pair of members to which the foil bearing is mounted at the outer diameter of said foil stiffener disk to direct the flow of cooling fluid from around the foil stiffener disk to the compliant foils on the thrust disk.

9. A fluid thrust bearing comprising:

a thrust runner;

a thrust plate to rotatably support the thrust runner;

a compliant foil bearing operably disposed between said thrust runner and said thrust plate and mounted on said thrust plate, said compliant foil bearing including a thrust disk having a plurality of circumferentially spaced, compliant foils each individually mounted, along the leading edge thereof, on said thrust disk and extending towards said thrust runner, and a foil stiffener disk having a plurality of upper and lower ridges alternately transversely disposed therearound between the thrust disk and the thrust plate; and a plurality of openings in said thrust disk to direct the flow of a cooling fluid from between the thrust disk and the thrust plate to between the thrust disk and the thrust runner, said plurality of openings in said thrust disk including a generally radially extending row of openings positioned directly beneath the trailing edge of one of said compliant foils.

10. A fluid thrust bearing comprising:

a thrust runner;

a thrust plate to rotatably support the thrust bearing runner;

a compliant foil bearing operably disposed between said thrust runner and said thrust plate and mounted on said thrust plate, said compliant foil bearing including a thrust disk having a plurality of individual, spaced, compliant foils mounted thereon toward said thrust runner and a foil stiffener disk having a plurality of upper and lower ridges alternately transversely disposed therearound between the thrust disk and the thrust plate; and a cooling flow directing flange at the inner diameter of said thrust disk directed towards said foil stiffener disk to direct the flow of cooling fluid from between the thrust disk and the thrust plate to between the thrust disk and the thrust runner.

11. A fluid thrust bearing comprising;
a thrust runner;
a thrust plate to rotatably support the thrust bearing runner;
a compliant foil bearing operably disposed between said thrust runner and said thrust plate and mounted on said thrust plate, said compliant foil bearing including a thrust disk having a plurality of individual, spaced, compliant foils mounted thereon towards said thrust runner and a foil stiffener disk having a plurality of upper and lower ridges alternately transversely disposed therearound between the thrust disk and the thrust plate; and a cooling flow directing flange at the outer diameter of said thrust disk directed towards saids foil stiffener disk to direct the flow of cooling fluid from between the thrust disk and the thrust plate to between the thrust disk and the thrust runner.

12. A fluid thrust bearing comprising:
a thrust runner;
a thrust plate to rotatably support the thrust bearing runner;
a compliant foil bearing operably disposed between said thrust runner and said thrust plate and mounted on said thrust plate, said compliant foil bearing including a thrust disk having a plurality of individual, spaced, compliant foils mounted thereon toward said thrust runner and a foil stiffener disk having a plurality of upper and lower ridges alternately transversely disposed therearound between the thrust disk and the thrust plate; and a cooling flow directing annular shield disposed on said thrust plate at the inner diameter of said foil stiffener disk to direct the flow of cooling fluid from between the thrust disk and the thrust plate to between the thrust disk and the thrust runner.

13. A fluid thrust bearing comprising:
a thrust runner;
a thrust plate to rotatably support the thrust bearing runner;
a compliant foil bearing operably disposed between said thrust runner and said thrust plate and mounted on said thrust plate, said compliant foil bearing including a thrust disk having a plurality of individual, spaced, compliant foils mounted thereon towards said thrust runner and a foil stiffener disk having a plurality of upper and lower ridges alternately transversely disposed therearound between the thrust disk and the thrust plate; and a cooling flow directing annular shield disposed on said thrust plate at the outer diameter of said foil stiffener disk to direct the flow of cooling fluid from between the thrust disk and the thrust plate to between the thrust disk and the thrust runner.

14. A fluid thrust bearing comprising:
a thrust runner;
a thrust plate to rotatably support the thrust bearing runner;
a compliant foil bearing operably disposed between said thrust runner and said thrust plate and mounted on said thrust plate, said compliant foil bearing including a thrust disk having a plurality of individual, spaced, compliant foils mounted thereon toward said thrust runner and a foil stiffener disk having a plurality of upper and lower ridges alternately transversely disposed therearound between the thrust disk and the thrust plate; and cooling flow directing means including a plurality of openings in said thrust disk and a flange at the inner diameter of said thrust disk directed towards said foil stiffener disk to direct the flow of a cooling fluid from between the thrust disk and the thrust plate to between the thrust disk and the thrust runner.

15. A fluid thrust bearing comprising:
a thrust runner;
a thrust plate to rotatably support the thrust bearing runner;
a compliant foil bearing operably disposed between said thrust runner and said thrust plate and mounted on said thrust plate, said compliant foil bearing including a thrust disk having a plurality of individual, spaced, compliant foils mounted thereon toward said thrust runner and a foil stiffener disk having a plurality of upper and lower ridges alternately transversely disposed therearound between the thrust disk and the thrust plate; and cooling flow directing means including a plurality of openings in said thrust disk and a flange at the outer diameter of said thrust disk directed towards said foil stiffener disk to direct the flow of a cooling fluid from between the thrust disk and the thrust plate to between the thrust disk and the thrust runner.

16. A fluid thrust bearing comprising:
a thrust runner;
a thrust plate to rotatably support the thrust bearing runner;
a compliant foil bearing operably disposed between said thrust runner and said thrust plate and mounted on said thrust plate, said compliant foil bearing including a thrust disk having a plurality of individual, spaced, compliant foils mounted thereon toward said thrust runner and a foil stiffener disk having a plurality of upper and lower ridges alternately transversely disposed therearound between the thrust disk and the thrust plate; and cooling flow directing means including a plurality of openings in said thrust disk and an annular shield disposed on said thrust plate at the inner diameter of said foil stiffener disk to direct the flow of a cooling fluid from between the thrust disk and the thrust plate to between the thrust disk and the thrust runner.

17. A fluid thrust bearing comprising:
a thrust runner;
a thrust plate to rotatably support the thrust bearing runner;
a compliant foil bearing operably disposed between said thrust runner and said thrust plate and mounted on said thrust plate, said compliant foil bearing including a thrust disk having a plurality of individual, spaced, compliant foils mounted thereon toward said thrust runner and a foil stiffener disk having a plurality of upper and lower ridges alternately transversely disposed therearound between the thrust disk and the thrust plate; and cooling flow directing means including a plurality of openings in said thrust disk and an annular shield disposed on said thrust plate at the outer diameter of said foil stiffener disk to direct the flow of a cooling fluid from between the thrust disk and the thrust plate to between the thrust disk and the thrust runner.

18. The fluid thrust bearing of claim 10 and in addition said thrust plate including an annular groove opposed to the flange at the inner diameter of said thrust disk.

19. The fluid thrust bearing of claim 11 and in addition said thrust plate including an annular groove opposed to the flange at the outer diameter of said thrust disk.

20. A thrust disk for a foil bearing comprising:
   a thin compliant flat ring disk;
   a plurality of circumferentially spaced, compliant foil elements individually mounted upon said disk and having a free, generally radially extending, trailing edge; and
   a plurality of openings in said disk, each of said openings being positioned generally between the an adjacent pair of the individually mounted, circumferentially spaced, compliant foil elements, said plurality of openings in said disk including a generally radially extending row of openings generally circumferentially aligned with and directly beneath the trailing edge of one of the circumferentially spaced, compliant foil elements.

21. A method of rotatively supporting a thrust runner on a thrust plate comprising the steps of:
   providing a compliant foil bearing between said thrust runner and said thrust plate, said compliant foil bearing including a thrust disk having a plurality of spaced, compliant foils mounted along the leading edge thereof on said thrust disk and extending towards said thrust runner, and a foil stiffener disk having a plurality of upper and lower ridges alternately transversely disposed therearound between the thrust disk and the thrust plate; and
   directing the flow of a cooling fluid from between the thrust disk and the thrust plate to between the thrust disk and the thrust runner by means of a flange on the thrust disk directed towards said foil stiffener disk.

22. The method of claim 21 wherein the thrust disk flange is at the inner diameter of the thrust disk.

23. The method of claim 21 wherein the thrust disk flange is at the outer diameter of the thrust disk.

24. A method of rotatively supporting a thrust runner on a thrust plate comprising the steps of:
   providing a compliant foil bearing between said thrust runner and said thrust plate, said compliant foil bearing including a thrust disk having a plurality of spaced, compliant foils mounted along the leading edge thereof on said thrust disk and extending towards said thrust runner, and a foil stiffener disk having a plurality of upper and lower ridges alternately transversely disposed therearound between the thrust disk and the thrust plate; and
   directing the flow of a cooling fluid from between the thrust disk and the thrust plate to between the thrust disk and the thrust runner by means of an annular shield on the thrust plate.

25. The method of claim 24 wherein the thrust plate annular shield is at the inner diameter of said foil stiffener disk.

26. The method of claim 24 wherein the thrust plate annular shield is at the outer diameter of said foil stiffener disk.

* * * * *